United States Patent
Reddersen

[11] Patent Number: 6,129,282
[45] Date of Patent: Oct. 10, 2000

[54] RUGGED SCANNING SUBSYSTEM FOR DATA READING

[75] Inventor: Brad R. Reddersen, Eugene, Oreg.

[73] Assignee: PSC Scanning, Inc., Eugene, Oreg.

[21] Appl. No.: 09/119,253

[22] Filed: Jul. 20, 1998

[51] Int. Cl.[7] ................................................ G06K 7/10
[52] U.S. Cl. ........................ 235/462.45; 235/462.36; 235/462.43; 235/462.48; 235/454
[58] Field of Search .................. 235/462.45, 462.36, 235/462.38, 462.4, 462.43, 462.48, 454, 472.01

[56] References Cited

U.S. PATENT DOCUMENTS

| | | | |
|---|---|---|---|
| 3,836,225 | 9/1974 | Wilde et al. | 350/6 |
| 4,385,798 | 5/1983 | Yevick | 350/96.14 |
| 4,410,235 | 10/1983 | Klement et al. | 455/612 X |
| 4,578,571 | 3/1986 | Williams | 235/472.01 |
| 4,672,215 | 6/1987 | Howard | 250/566 |
| 4,679,102 | 7/1987 | Wevers et al. | 360/75 |
| 4,691,212 | 9/1987 | Solez et al. | 346/108 |
| 4,987,781 | 1/1991 | Reimann | 73/517 |
| 5,031,615 | 7/1991 | Alt | 128/419 |
| 5,097,354 | 3/1992 | Goto | 359/212 |
| 5,168,149 | 12/1992 | Dvorkis et al. | 235/472.01 |
| 5,170,277 | 12/1992 | Bard et al. | 235/472.01 X |
| 5,177,631 | 1/1993 | Orlicki et al. | 359/214 |
| 5,241,438 | 8/1993 | Matsushima | 360/105 |
| 5,313,836 | 5/1994 | Fujii et al. | 73/517 |
| 5,315,097 | 5/1994 | Collins, Jr. et al. | 235/472.01 |
| 5,329,103 | 7/1994 | Rando | 235/462.45 |
| 5,429,993 | 7/1995 | Beitman | 437/228 |
| 5,436,838 | 7/1995 | Miyamori | 364/424 |
| 5,448,436 | 9/1995 | Albrecht | 360/105 |
| 5,475,206 | 12/1995 | Reddersen et al. | 235/462.45 |
| 5,559,697 | 9/1996 | Wang | 364/424 |
| 5,600,217 | 2/1997 | Bartlett | 318/434 |
| 5,629,510 | 5/1997 | Quinn et al. | 235/462.45 |
| 5,663,855 | 9/1997 | Kim et al. | 360/105 |
| 5,719,333 | 2/1998 | Hosoi et al. | 73/514.05 |

*Primary Examiner*—Michael G Lee
*Attorney, Agent, or Firm*—Lyon & Lyon LLP

[57] ABSTRACT

A scanning system and method of data reading in which the scanning system is provided with a more rugged scanning mechanism which is "parked" or otherwise locked in position, moved to a protected mechanically position, or into a secured condition thereby protecting more delicate scanning components, such as flexures, from damage due to external mechanical shock.

24 Claims, 5 Drawing Sheets

RUGGED SCANNING SUBSYSTEM FOR DATA READING

BACKGROUND

The field of the present invention relates to optical systems for data reading and particularly to a scanning system having improved resistance to shock and vibration.

Typically a data reading device such as a bar code scanner illuminates a bar code and senses light reflected from the code to detect the bars and spaces of the code symbols and thereby derive the encoded data. In a common system, an optical beam of light, such as a laser beam produced by a laser diode is scanned over a scan angle so as to scan the laser spot across the item being read. A variety of mechanical scanning mechanisms are known as described in for example U.S. Pat. Nos. 5,475,206 and 5,629,510 or U.S. application Ser. No. 08/934,487, each of these disclosures hereby incorporated by reference, such scanning mechanisms comprising a rotating polygon mirror, dithering or oscillating mirror, scanning light source or laser diode, rotating/oscillating prisms, holographic elements and others devices. Essentially all these scanners include a supporting structure which allows for movement of the mechanical scanning mechanism.

Current mechanical scanning mechanisms are relatively sensitive to shock. Handheld scanners are particularly subjected to shock and have been equipped with shock protection such as by containing the scanning mechanism within a scan module and mounting the scan module within a housing via shock mounts as described in U.S. Pat. No. 5,475,206, incorporated by reference. Nonetheless because of this sensitivity to shock and the use of these devices in hand-held applications, these scanners and scan engines are often damaged before they would have worn out for other reasons.

SUMMARY OF THE INVENTION

The present invention is directed to a scan module and scanning assemblies therefore including a mechanism for providing a more rugged scanning mechanism which is "parked" or otherwise locked in position, moved to a protected mechanically position, or into a secured condition thereby protecting the more delicate scanning components, such as flexures, from damage due to external mechanical shock.

DETAILS DESCRIPTION OF PREFERRED EMBODIMENTS

Preferred embodiments will now be described with reference to the drawings. For clarity of description, any element numeral in one figure will represent the same element if used in any other figure.

Figure 1:
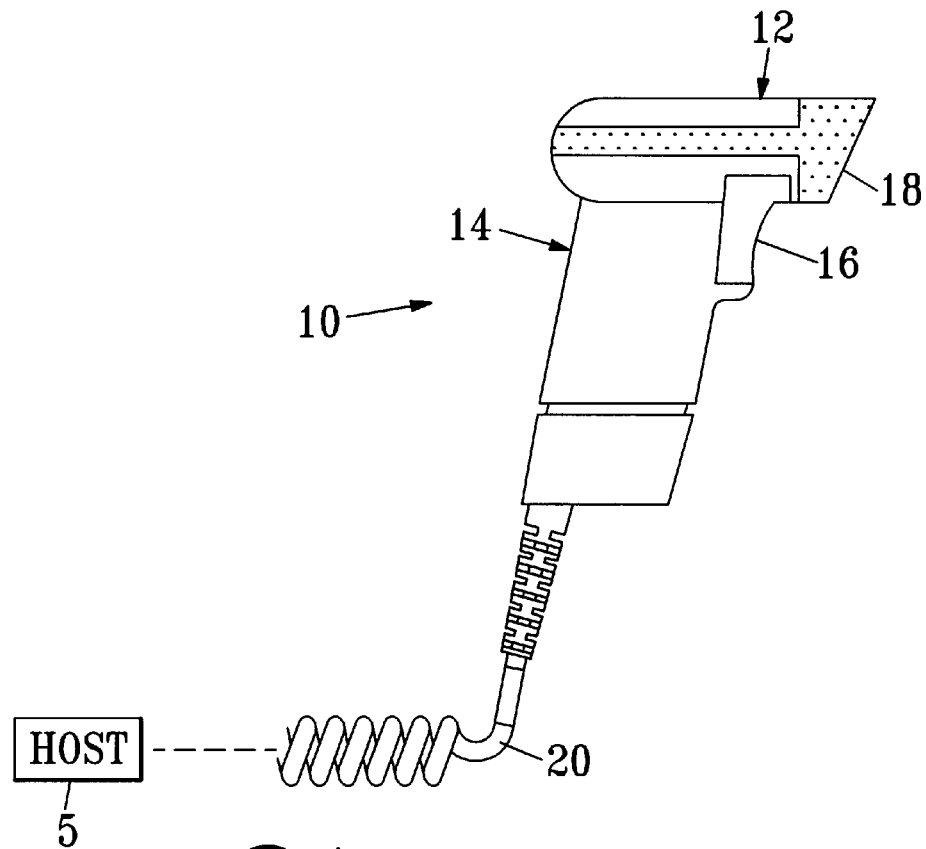
FIG. 1 is a side view of a handheld scanner as may be utilized by the present invention.
Figure 2:
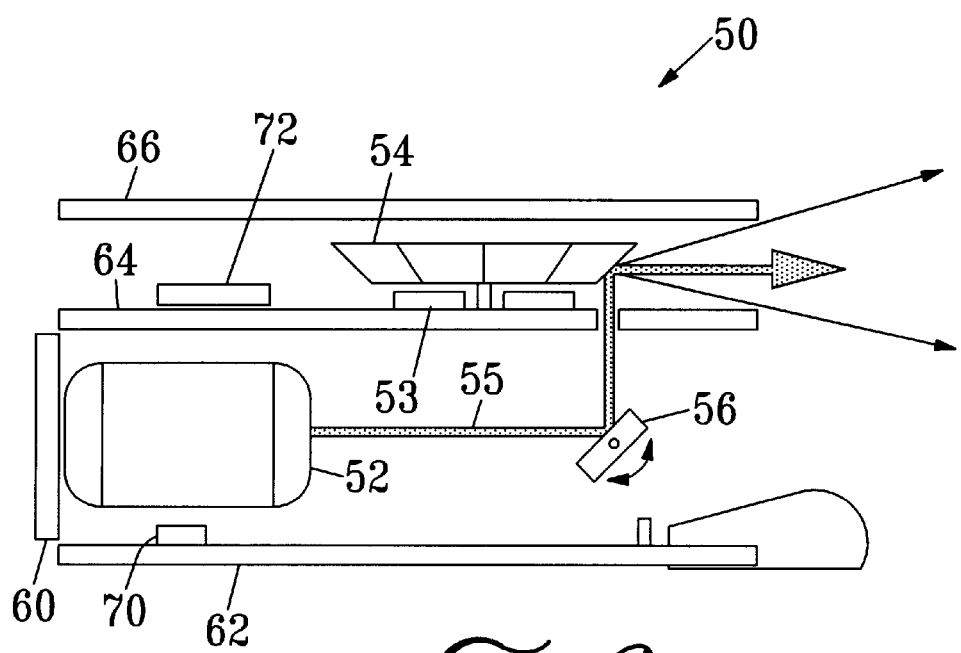
FIG. 2 is a diagrammatic side view of an example scan module.

FIGS. 1–2 illustrate an example of a bar code reader 10 configured as a handheld gun-shaped device constructed of a lightweight plastic housing having a head portion 12 and pistol-grip type handle portion 14. The head portion 12 contains a removable scan module which contains a light source, a detector, the optics and signal processing circuitry. The scanner 10 may be attached to a host 5 via a cable 20, connected or incorporated into a portable data terminal, or may be cordless, powered by an internal battery, communicating with the host via wireless link or storing data in memory for periodic download. Such as when integrated in a portable data terminal. A light-transmissive window 18 in the front end of the scan head portion 12 permits outgoing light beam 55 to exit and the incoming reflected light to enter. The user aims the reader 10 at a bar code symbol and actuates a trigger 16 on the handle portion 14 to activate the light source and scanning mechanism to scan the beam across the symbol.

The scan assembly 50 may include one or more scan mechanisms, for example as shown in FIG. 2, a dithering mirror assembly 56 and a rotating polygon mirror assembly 54. A parking assembly for locking the scanning mechanism in place for shock protection, may be provided on one or both of the scan mechanism 54, 56. The scan assembly module 50 is positioned within the scan head 12 and may be mounted to sides of the scan head 12 by shock mounts as described in U.S. Pat. No. 5,475,206 to provide further shock protection. The scan assembly 50 typically may include a light source, such as a laser diode 52 producing a light beam 55 which is scanned by one or more mirror assemblies 54, 56 and then exits the window 18. The components may be mounted to a suitable chassis and contained within an enclosure the sides of which may be part of the chassis or integrated into printed circuit boards 60, 62, 66. Individual printed circuit boards or chassis elements 60, 62, 64, 66 may be provided with additional shock mounting features.

Though the following examples are illustrated as applied to locking mechanisms on dithering mirror assemblies, such mechanism may be applied to locking down other mechanical scan mechanisms. For example, the scan mechanism may comprise rotating polygon mirror, dithering or oscillating mirror, pivoting/oscillating light source or laser diode, rotating/oscillating prisms, holographic elements and others devices—essentially any supporting structure which allows for movement of a mechanical scanning mechanism.

Figure 3:
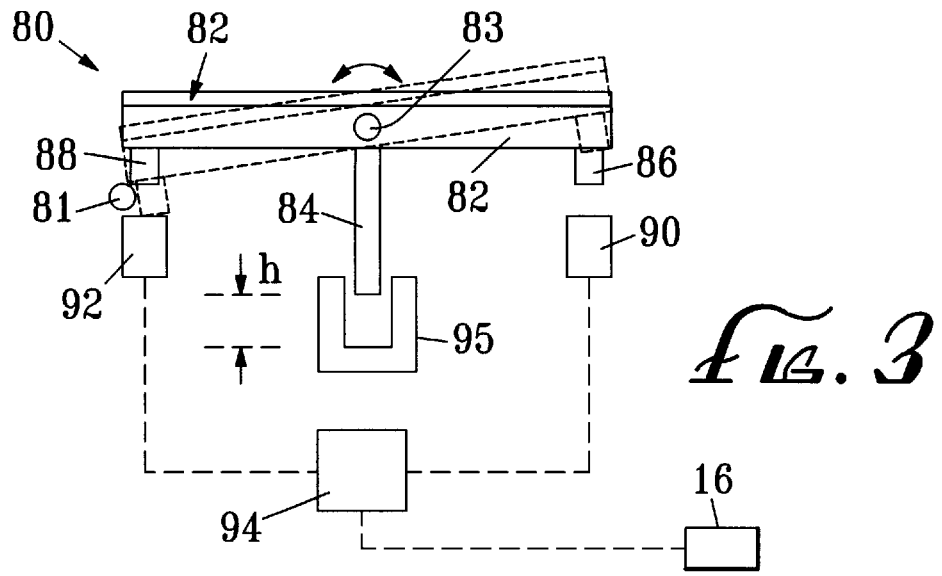
FIG. 3 illustrates a scanning mechanism employing a parking scheme according to a first preferred embodiment of the present invention.

FIG. 3 illustrates a first embodiment comprising a dithering mirror assembly 80. The assembly 80 includes a mirror 82 mounted to an arm 84, the mirror 82 supported to pivot about pivot point 83. The mirror assembly 80 is driven by a magnetic drive on one or both sides of the mirror 82. In a first example, permanent magnets 86, 88 are disposed on opposite sides of the mirror 82 which are driven by magnet coils 90, 92 as controlled by controller 94. In a normal rest state when the trigger 16 is not depressed, one or both of the coils 90, 92 are energized to draw the mirror 82 into a shock protective locked position adjacent one or both coils 90, 92. Alternately, the entire mirror assembly may translate, for example having arm 84 slide by an amount -h- into a slot within a holder 95 thereby securing the scan mechanism.

The magnets 86, 88 and coils 90, 92 may comprise the drive mechanism for dithering (as well as providing the parking function) or dither drive may be separate such as a drive magnet and stator assembly at element 95 which drives a rotor element mounted on the end of arm 84. The locking function may also employ one or more stops. For example, in normal dithering operation, the driven magnet 88 would not contact the drive magnet 92, but during locking, the drive magnet may be controlled to pull the magnet 88 into contact to secure the scan mechanism in place against the drive magnet 92 itself. Alternately, one or more separate stops may be employed. For example, during locking, the drive magnet 92 may be controlled to pull the magnet 88 into contact with the stop 81 to secure the scan mechanism in place against the stop 81.

Figure 4:
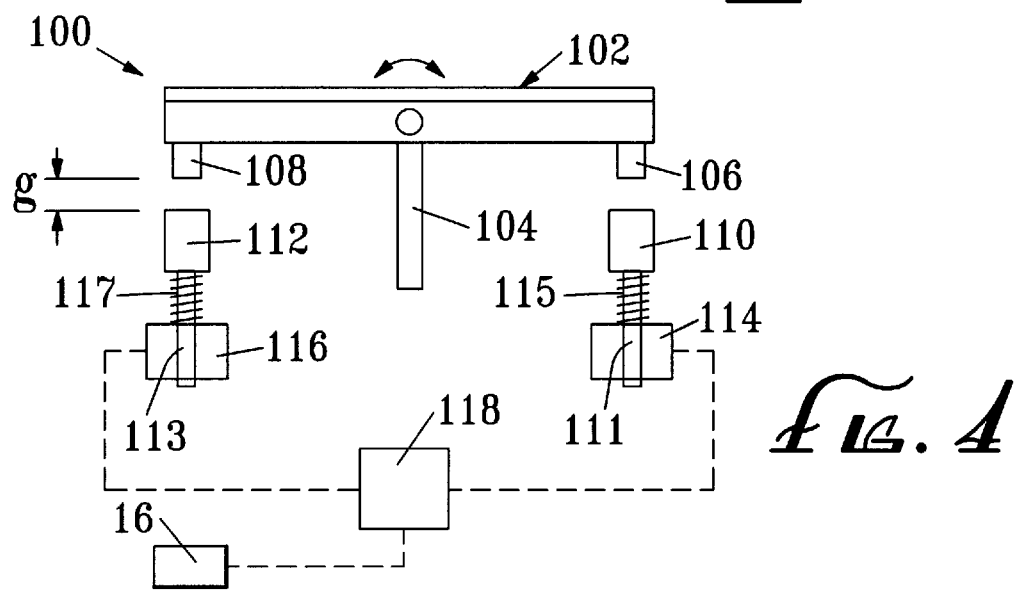
FIGS. 4–5 illustrate a scanning mechanism employing a parking scheme according to a second embodiment of the present invention.
Figure 5:
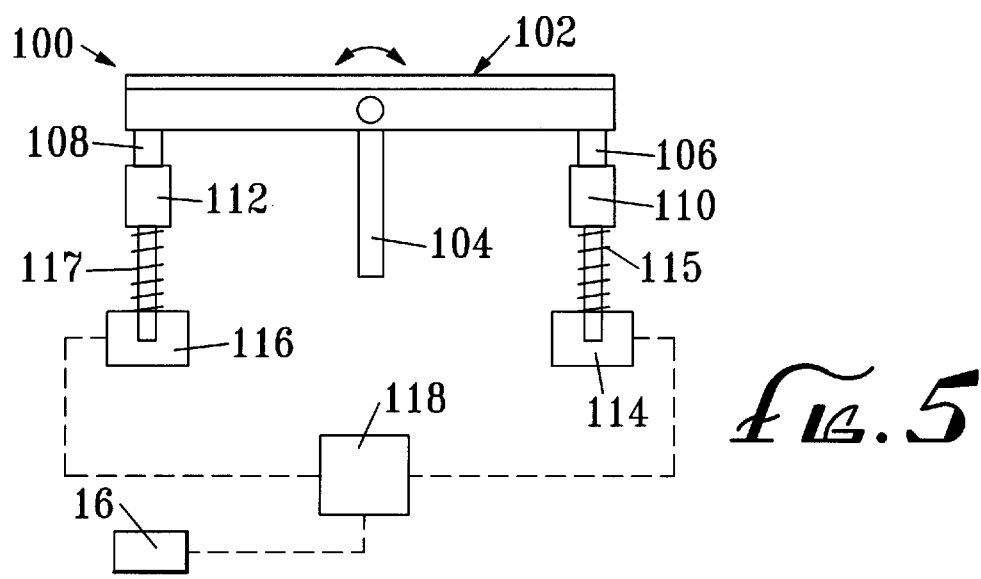

FIGS. 4–5 illustrate a parking assembly 100 according to a second embodiment in which the dithering mirror 102 includes magnets 106, 108 on opposite ends. The coils 110, 112 are mounted on arms 111, 113 disposed within solenoid motor 114, 116. The solenoids 114, 116 drive the arms 111, 113 (and thus the magnet coils 110, 112) toward and/or away from the magnets 106, 108 on the mirror 102. In normal operation as shown in FIG. 4, the arms 111, 113 are retracted providing a clearance or gap -g- between the magnets 106, 108 on mirror 102 and the coils 110, 112. When signaled by controller 118, the solenoid extends the arms 111, 113 thereby axially translating the coils 110, 112 to a position adjacent the magnets 106, 108 as illustrated in FIG. 5. Upon energizing the coils 110, 112, the magnets 106, 108 are secured to the coils thereby locking the mirror 102 in place providing the desired shock protection.

The solenoids 114, 116 may include springs 115, 117 which bias the arms 111, 113 in a normally extended position (FIG. 5). Thus the mirror 102 is normally in the locked condition when power is not supplied to the solenoids 114, 116. Alternately, the solenoids 114, 116 may be two-position devices (without the springs 111, 113) when actuated switch from one position to the other and held in position by inertia and/or friction. The magnets 110, 112 may comprise electromagnet coils or may be permanent magnets which do not require power therefore enabling locking of the dither mirror 102 even when power to the system is off. Alternately, the magnets 110, 112 may be a hybrid magnet such that when current is applied the magnetic field is off or neutralized thereby releasing locking power and when no power is applied to the magnets 110, 112 the magnet field of the magnets 110, 112 is on therefore enabling locking of the dither mirror 102 when power to the system is off.

During operation, the system may be operated in many different configurations and operation schemes. In one configuration, the mirror 102 may be normally locked when the scanner is not in operation, such as when the trigger is not actuated. Alternately, a timeout function may be applied, the locking mechanism delaying actuation for a given time delay once the trigger is released.

The locking system is particularly useful for scanners which are handheld and may be more likely subjected to external shock caused by dropping or impact. When applied to a combination handheld/fixed scanner having both handheld and fixed modes of operation, for example U.S. application Ser. No. 08/792,829 herein incorporated by reference, the locking scheme may be activated depending upon the mode of operation. The system may be controlled to activate locking of the scan mechanism in response to release of the trigger 16 when in a first handheld mode of operation and operate differently when operating in the fixed mode. In the fixed mode, the locking system may be deactivated altogether or alternately work on a timeout, locking down when the scanning motor powers down in a power saving mode.

In another scheme, the system may be provided with a sensor 70 (see FIG. 2) which senses some condition of the scanner such as undue acceleration, high velocity or vibration. Such a system is particularly desirable for a handheld scanner. A preferred sensor construction may comprise an acceleration sensor comprising an accelerometer chip mounted to the printed circuit board 62 or alternately an accelerometer constructed in a semiconductor manufacturing process such that it may be integrally formed with the printed circuit board. The controller 118 may be formed or included with electronics on the board. Operatively, the system senses an acceleration experienced by the scan module, determines whether the acceleration sensed exceeds a threshold magnitude and if so locks the mirror.

In normal or simplified operation, the locking mechanism may simply be applied when the trigger 16 is not actuated. This single control scheme may not accommodate every operation requirement. The typical occurrences at which it is desirable that the locking mechanism be activated are (1) impact upon dropping of the scanner or (2) impact into solid object. The second condition is particularly troublesome because the trigger may be actuated so the system could be subjected to extreme shock without the locking mechanism in place. The acceleration sensor may be optimized to sense specific accelerations on the basis of direction (the sensor may detect accelerations in either 2-D or 3-D depending upon its configuration), amplitude, or frequency. This optimization may permit the sensor to distinguish between regular motions encountered by the scanner during aiming by the user as opposed to more extreme accelerations encountered when dropped or bumped into an object for example. It may be desirable that the sensing system and locking mechanisms operate quickly enough to react to even sudden impacts.

Figure 6:
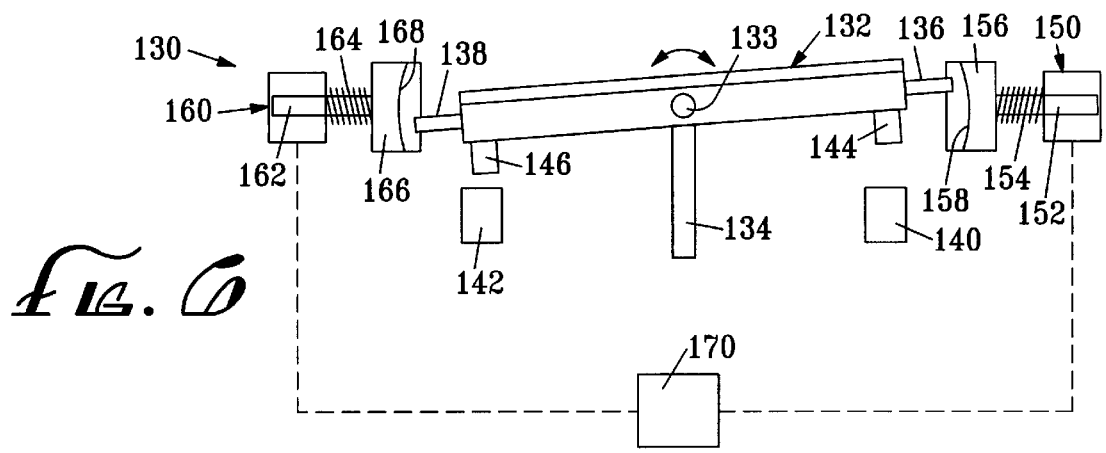
FIGS. 6–7 illustrate a scanning mechanism employing a parking scheme according to a third embodiment of the present invention.
Figure 7:
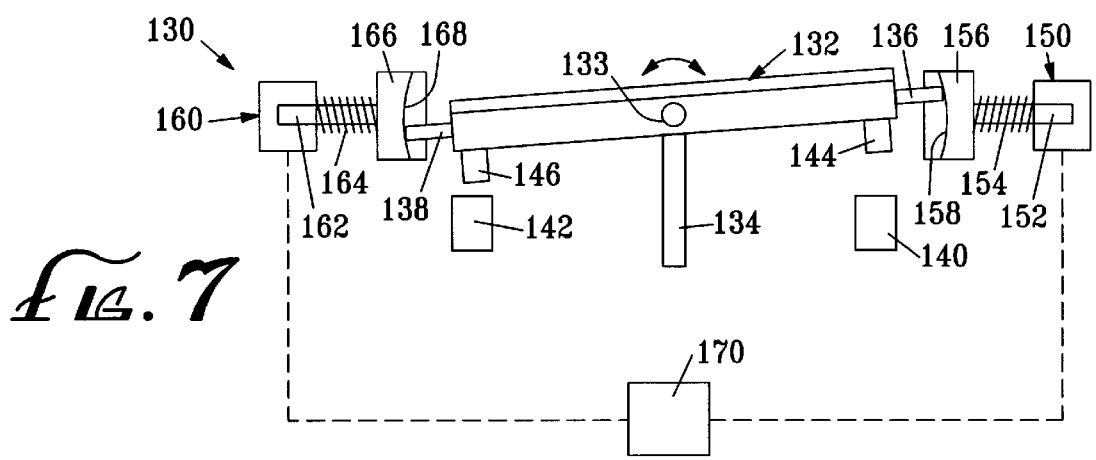

FIGS. 6–7 illustrate a parking assembly 130 according to a third embodiment in which the dithering mirror 132 includes magnets 144, 146 on opposite ends. Dither drive coils 140, 142 are mounted in a fixed position adjacent the magnets 144, 146. Application of current to the coils 140, 142 drives the magnets 144, 146 thereby oscillating the mirror 132 at a desired frequency. The mirror assembly 132 may be mounted to a flexure element 134 such as a metal or plastic spring which supports the mirror assembly 132 in a cantilevered fashion allowing the mirror 132 to pivot thereby providing the scanning motion. In this embodiment the flexure 134 is perpendicular to the mirror 132, but the locking mechanism may be applied to other dither mirror configurations such as for example the V-spring configuration in U.S. Pat. No. 5,629,510.

The mirror assembly 132 includes extensions 136, 138. Locking of the mirror assembly 132 is accomplished by a pair of solenoid devices 150, 160 positioned on opposite sides of the mirror 132. The solenoids 150, 160 includes an extending arm 152, 162 which extends toward or away from the mirror 132 upon actuation of the solenoid. The springs 154, 164 may be included to bias the arms 152, 162 in the retracted position (as shown in FIG. 6). Blocks 156, 166 are disposed on the ends of the shafts 152, 162 for contacting the arms 136, 138.

At a given condition controller 170 signals the solenoids 150, 160 to drive the blocks 156, 166 against the mirror assembly 132 (into position as in FIG. 7) locking it in place to protect it from shock. The contact surfaces 158, 168 of the blocks are curved to accommodate the pivoting action of the arms 136, 138 at the outer ends of the mirror assembly 132 enabling locking the mirror assembly 132 at any pivoting position. By applying equal pressure and contact stroke at each end, the locking mechanism should merely hold the mirror assembly in place without applying any torque to the assembly 132 when moving to the locking position of FIG. 7. Further, the mirror assembly 132 may be immediately locked, even in a pivoted position as shown in the figure, without having to be pivoted to a rest position.

Figure 8:
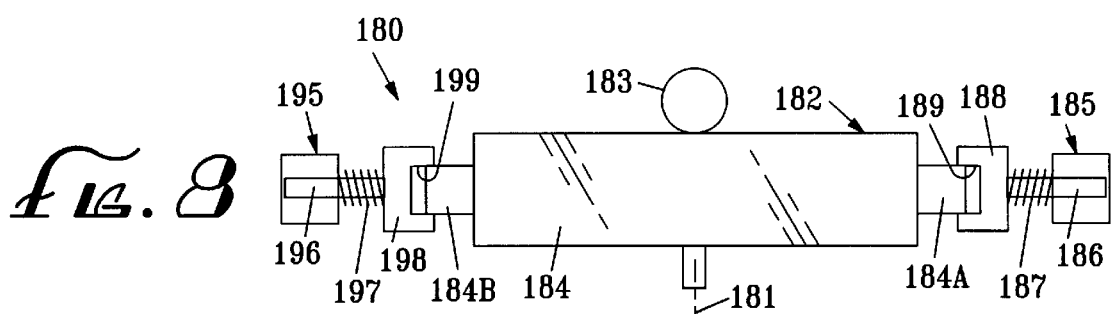
FIGS. 8–9 illustrate a scanning mechanism employing a parking scheme according to a fourth embodiment of the present invention.
Figure 9:
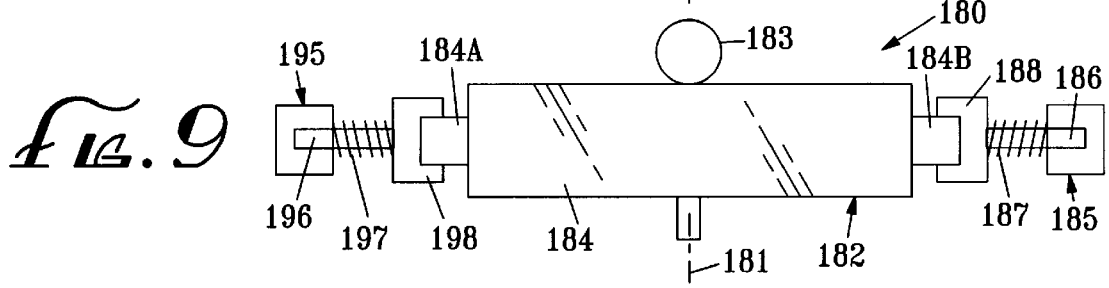

FIGS. 8–9 illustrate a parking assembly 180 according to a fourth embodiment in which the scan assembly 182 is driven by a suitable drive (not shown) oscillating the scan assembly 182 at a desired frequency about axis 181.

The scan assembly 182 includes a laser diode 183, a mirror 184, and extensions 184a, 184b on opposite sides of the mirror 184. Locking of the scan assembly 182 is accomplished by a pair of solenoid devices 185, 195 positioned on opposite sides of the mirror 184. Each solenoid 185, 195 includes an extending shaft 186, 196 which extends toward or away from the mirror 184 upon actuation of the solenoid. Springs 187, 197 may be included to bias the shafts 186, 196 in the retracted position (as shown in FIG. 8). Blocks 188, 198 are disposed on the ends of the shafts 186, 196 for contacting the extensions 184a, 184b on the scan assembly 182. The ends of the blocks 188, 198 comprise an enclosure 189, 199, the vertical surface of which may be curved to accommodate the pivoting positions of the assembly 182. When moved into locked position as in FIG. 9, the extensions 184a, 184b may be lightly contacted or nearly contacted with a small clearance. Upon being subjected to external shock, the scan assembly 182 is restrained by the enclosures 189, 199 which combine to prevent overflexing of the flexure element or other component.

Figure 10:
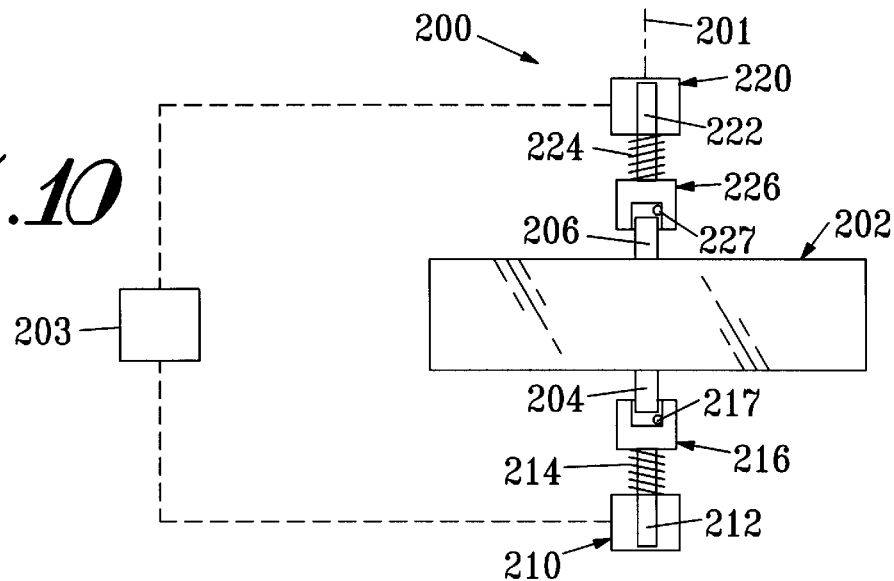
FIGS. 10–11 illustrate a scanning mechanism employing a parking scheme according to a fifth embodiment of the present invention.
Figure 11:
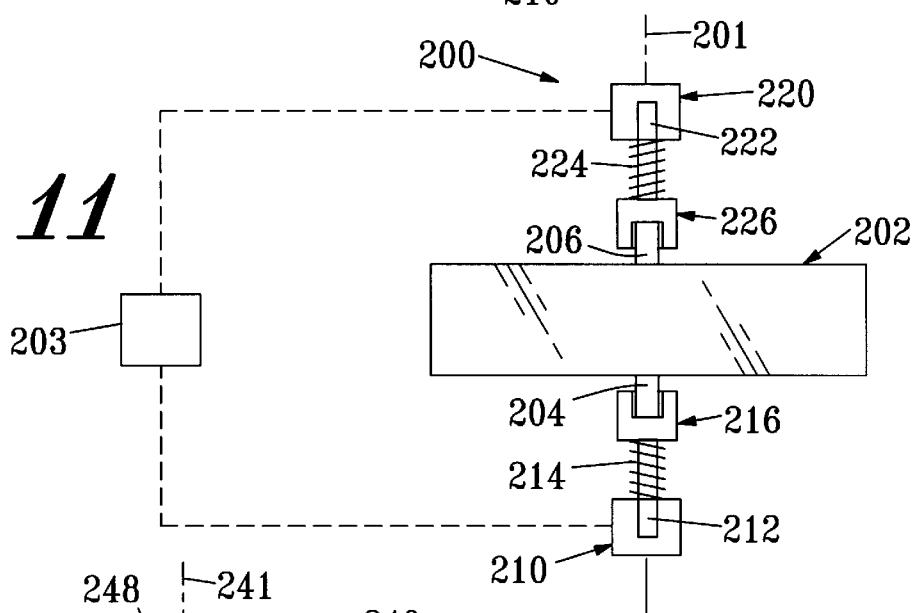

FIGS. 10–11 illustrate a parking assembly 200 according to a fifth embodiment in which the dithering mirror 202 is driven by a suitable drive (not shown) oscillating the mirror 202 at a desired frequency about axis 201. Unlike the previous embodiments which locked the mirror assembly at the ends of the mirror, the parking assembly 200 secures the mirror assembly toward a center of the mirror 202 which may preferable be at the pivot axis 201.

The mirror assembly 202 includes extensions 204, 206. Locking of the mirror assembly 202 is accomplished by a pair of solenoid devices 210, 220 positioned on opposite sides of the mirror 202. Each solenoid 210, 220 includes an extending shaft 212, 222 extends toward or away from the mirror 202 upon actuation of the solenoid. Springs 214, 224 may be included to bias the shafts 212, 222 in the retracted position (as shown in FIG. 10). Blocks 216, 226 are disposed on the ends of the shafts 212, 222 for contacting the extensions 204, 206 on the mirror assembly 202. The ends of the blocks 216, 226 may comprise an enclosure 217, 227 to further encompass the pins 204, 206. When moved into locked position as in FIG. 11, the pins 204, 206 may be lightly contacted or nearly contacted with a small clearance. Thus upon being subjected to external shock, the mirror assembly 202 is restrained by the enclosures 217, 227 which combine to prevent overflexing of the flexure element or other component.

The parking system may be designed to provide some shock protection even in the event the locking mechanism has not actuated to the locking position. For example in the parking system 200 of FIGS. 10–11, the clearance of the enclosures 217, 227 to the respective pins 204, 204 may be designed to be sufficiently small so as to provide some over-flexure protection even when not actuated (FIG. 10) and provide a full contact locking when actuated to the position as in FIG. 11.

Figure 12:
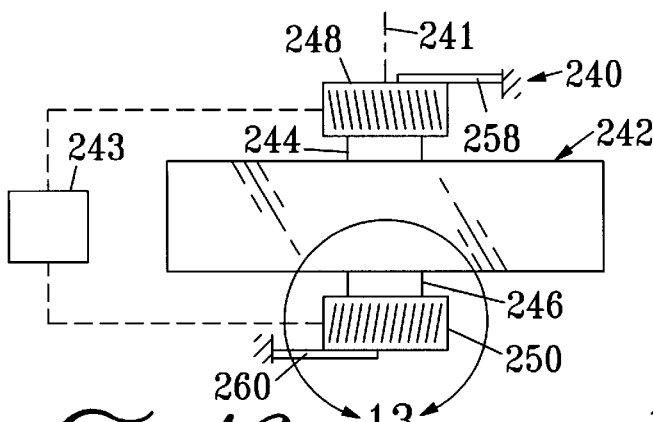
FIGS. 12–13 illustrate a scanning mechanism employing a parking scheme according to a sixth embodiment of the present invention.
Figure 13:
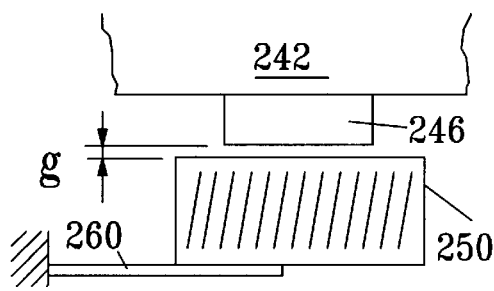

FIGS. 12–13 illustrate a parking assembly 240 according to a sixth embodiment in which the dithering mirror 242 is driven by a suitable drive (not shown) oscillating the mirror 242 at a desired frequency about axis 241. As in the system 200 of FIGS. 10–11, the parking assembly 240 more centrally secures the mirror assembly, closer to the pivot axis 241 of the mirror assembly 242. Magnets 244, 246 are mounted on the top and bottom of the mirror assembly 242. Electromagnets 248, 250 are positioned adjacent each magnet 244, 246. As illustrated in FIG. 12, electromagnet 250 is positioned with a tight clearance (gap -g-) to the moving magnet 246. When activated by controller 243, the magnet 250 attracts the moving magnet 246 thereby locking the mirror assembly 242 between the magnets 248, 250.

The clearance gap -g- may be maintained even when the magnets 248, 250 are actuated, or sufficient flexure may be provided to the system to eliminate the gap and permit the electromagnets 248, 250 to contact the magnets 244, 246. Such contact may further secure the mirror assembly 242 via the resulting friction contact. Flexure may be provided by mounting the magnets 248, 250 on mounting arms 258, 260 which provide the desired amount of flexure yet provide for sufficient strength for securing the mirror assembly when locking.

Figure 14:
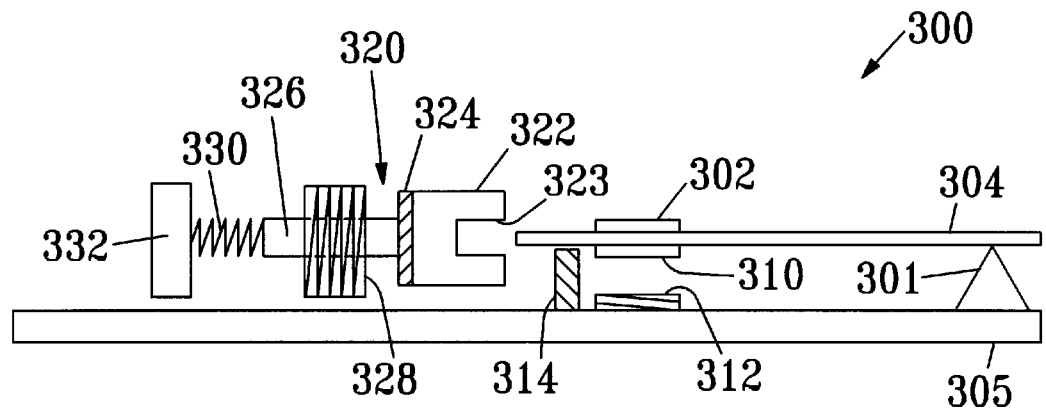
FIGS. 14–16 illustrate scanning mechanisms employing a parking schemes according to seventh and eighth embodiment of the present invention.
Figure 15:
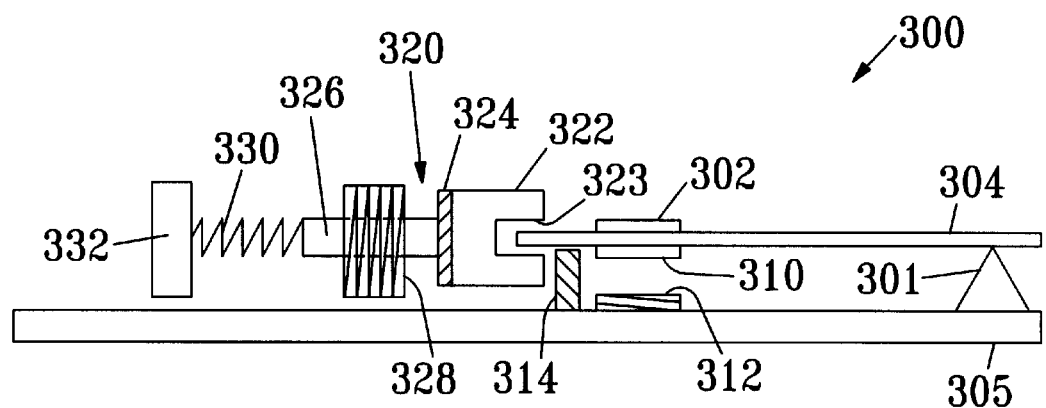

FIGS. 14–15 illustrate a parking assembly 300 according to a seventh embodiment in which the dithering mirror 302 is driven by a flexure-based magnetic drive mechanism for oscillating the mirror 302 at a desired frequency about a fixed pivot 301.

The flexure 302 is mounted at its fixed end to a fixed pivot 306 which in turn is mounted to a base or chassis 305. The mirror 302 is mounted on the dithering or free end of the flexure 304. A permanent magnet 310 is mounted on the free end of the flexure 304 on a side thereof opposite to the mirror 302. A electromagnetic drive coil 312 is mounted on the base 305 adjacent the magnet 310. At rest, the flexure 304 will pull the magnet and mirror assembly 302/310 to a balance position roughly parallel to the base 305. When activated, the electromagnetic coil 312 will act on the magnet 310 flexing the flexure 304 thereby oscillating the mirror 302. A shock absorber or damper 314 is mounted to the base 305 to prevent the flexure 304 from pulling back too fast when power is turned off to the device.

Locking of the mirror assembly 302 is accomplished by a locking device 320 disposed adjacent the free end of the flexure 304. A fixed block 332 is rigidly attached to the base 305. A spring 330 is attached to a shaft 326 which in turn passes through an electromagnetic coil 328 and is attached to a capture unit 322. A driven magnet 324 is attached to one end of the capture unit 322 adjacent the coil 328. The capture unit 322 may simply comprise a slot 323 designed to hold the flexure 304 in place when the dithering device 300 is at rest. When the power is off (and the coil 328 is not energized) the spring 330 will be biased in the extended conditions (as in FIG. 15) pushing the shaft 326 and capture unit 322 over the edge of the flexure 304 securing inhibiting the flexure 304 from overflexing during shock.

When power is applied to the unit, the sequence of power on will first apply the current to the coil 328 creating the magnetic field that pulls on the magnet 324 thereby pulling the capture unit away from the flexure 304 as shown in FIG. 14. Next step in the sequence is energizing the dither motor coil 312 to produce oscillating magnetic fields which alternate to push or pull the magnet 310 thereby flexing the flexure to cause the mirror 302 to oscillate to allow for scanning of a light beam reflect from the mirror 302.

The system 300 may be incorporated into a scan module and otherwise installed in a hand held scanner as in FIG. 1. When the scanner is dropped, the trigger 16 on the scanner is necessarily released and the flexure would, because of spring pull without power to the device, move the flexure 304 quickly back down against the damper or shock absorber 314. The more slowly moving spring 330 (designed to respond less quickly than the flexure) would move the capture unit 322 to capture the end of the flexure 304 thereby protecting it from damage due to shock on impact.

The system controller which controls the parking mechanism in any of the above embodiments may be incorporated into a microprocessor on board the scanner printed circuit board or may comprise a CMOS or other specialized chip 72 on the printed circuit board 64 (see FIG. 2).

Figure 16:
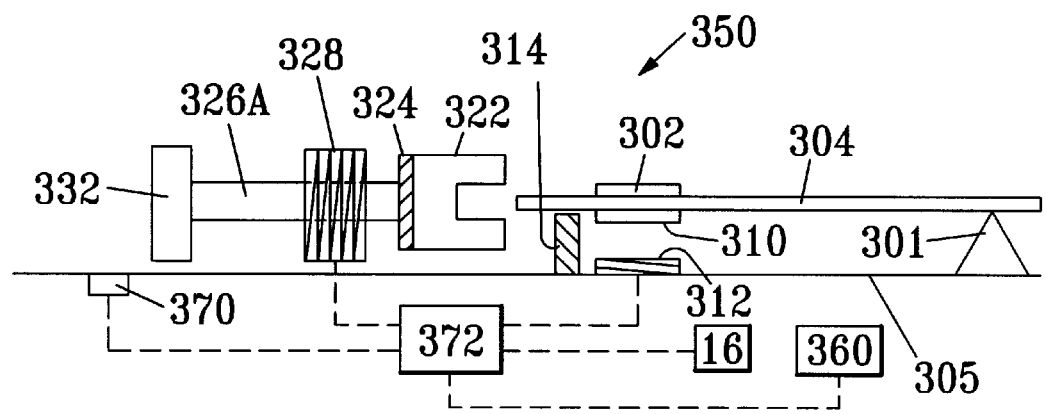

It is preferred that the locking mechanism be held in place and operate under little or no power. The system 350 of FIG. 16, is similar to the system 300 of FIGS. 14–15 and like elements are designated by the same numerals. The main difference is that the system 350 does not have a spring for returning the shaft 326a to the locking position. In this embodiment, the shaft 326a is actively driven between the locking position (see FIG. 15 for example) and the unlocked position (see FIG. 16). When the trigger 16 is pulled to engage scanning, the controller 372 proceeds as follows: (1) energizing coil 328 to drive the magnet 324 and capture unit 322 to the unlocked position (FIG. 16) releasing the flexure 304 and (2) once released, energizing the dither drive coil 312 to drive the flexure device. The shaft 326a and capture unit 322 remain in place due to inertia and/or friction (which may of course be implemented in the previous embodiments) in either the locked or unlocked position. After scanning once the trigger 16 is released, the controller 372 proceeds to a shutdown/parking sequence by (1) discontinuing energizing of coil 312 thereby stopping dithering of the mirror 302; (2) energizing the coil 328 to repel the magnet 324 to move the capture unit 322 to the locking position. Advantageously, this system 350 does not require power to maintain the capture unit in the locked position. Further by actively driving the capture unit to the locked position, the locking may be controlled to operate at greater speed.

Since the system 350 requires power to drive the locking mechanism into place, power will need be supplied after trigger release. It is expected that the scanner unit will have operational power for at least the amount of time it takes after the trigger is released to move the locking mechanism into place. In the event that the power required is not available from the scanner or accompanying data terminal unit power supply, a battery or capacitor 360 may be provided which is trickle charged and used to provide the power for the coil 328 for driving the device to the locking position (as well as power for driving the device to the unlocked position).

Depending upon power requirements, the mirror drives themselves may provide the power to drive the locking mechanism to the locked position. When in motion the dithering flexure 304 and/or the drive motor 53 for the rotating polygon 54 (see FIG. 1) may have sufficient stored mechanical energy. By providing the motor with back-EMF control circuitry, when the scanner drive motor is de-energized, this stored energy may be converted into electrical power, referred to as "back-EMF". This back-EMF electrical power from the motor may provide sufficient power to energize the coil 328 and drive the capture unit 322 to the locking position even when there is no other power in the system. The back-EMF circuitry may be a separate controller or integrated with controller 372.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A method of preventing damage to a scanning mechanism of a scan module, comprising the steps of
   generating an optical beam and directing the optical beam along an outgoing path;
   scanning the optical beam over a scan angle with a moving scan mechanism;
   upon actuation of a switch, activating the scan mechanism, thereby moving the scan mechanism for scanning the optical beam;
   upon release of the switch, deactivating the scan mechanism and activating a lock mechanism for locking the scan mechanism in place.

2. A method according to claim 1 wherein the scan module is positioned in a handheld bar code scanner and the switch comprises a trigger manually actuable by a user.

3. A method according to claim 1 wherein the step of locking the scan mechanism comprises
   moving the scan mechanism out of its operating position and into a protected location.

4. A method according to claim 1 wherein the step of locking the scan mechanism comprises
   moving a locking element into contact with the scan mechanism.

5. A method according to claim 1 wherein the scan mechanism comprises a dithering scan element supported by a flexure and which oscillates about a pivot axis.

6. A method according to claim 5 wherein step of locking the scan mechanism comprises moving locking elements in a direction perpendicular to the pivot axis into contact with opposite ends of the dithering scan element.

7. A method according to claim 5 wherein step of locking the scan mechanism comprises moving locking elements in a direction along the pivot axis into contact with opposite sides of the dithering scan element.

8. A method according to claim 5 wherein step of locking the scan mechanism comprises moving locking elements in a direction along the pivot axis into contact with opposite sides of the dithering scan element.

9. A method according to claim 5 wherein the dithering scan element is driven by a magnetic drive and wherein the step of locking the scan mechanism comprises operating the same magnetic drive to move the dithering scan element into a secured position.

10. A method of preventing damage to a scanning mechanism of a scan module, comprising the steps of
    generating an optical beam and directing the optical beam along an outgoing path;
    scanning the optical beam over a scan angle with a moving scan mechanism;

upon actuation of a switch, activating the scan mechanism;

upon release of the switch, deactivating the scan mechanism and locking the scan mechanism in place;

sensing an acceleration experienced by the scan module;

determining that the acceleration sensed exceeds a threshold magnitude;

locking the scan mechanism in place in response to determining that the acceleration sensed exceeds the threshold magnitude.

11. A method of preventing damage to a scanning mechanism of a scan module, comprising the steps of generating an optical beam and directing the optical beam along an outgoing path;

scanning the optical beam over a scan angle with a moving scan mechanism;

upon actuation of a switch, activating the scan mechanism;

upon release of the switch, deactivating the scan mechanism and locking the scan mechanism in place;

wherein the scan mechanism comprises a dithering scan element supported by a flexure and which oscillates about a pivot axis, wherein step of locking the scan mechanism comprises positioning at least one permanent magnet on the scan mechanism;

positioning a fixed electromagnet proximate each permanent magnet;

activating the electromagnet to attract the permanent magnet thereby locking the scan mechanism.

12. A method of preventing damage to a scan assembly of a scan module comprising the steps of:

providing a moving scan component supported by a flexure for scanning an optical beam over a scan angle toward an object to be scanned;

oscillating the scan component about an axis during reading; and resisting overflexing the flexure when the scan module is subjected to shock forces, by sensing a predetermined operative condition experienced by the scan module, stabilizing the scan component to a fixed element when the predetermined operative condition is sensed.

13. A method according to claim 12 wherein the step of stabilizing the scan component comprises moving the scan component into a protected location.

14. A method according to claim 12 wherein the step of stabilizing the scan component comprises moving a locking element into contact with the scan component.

15. A method according to claim 12 wherein the scan component is oscillated upon actuation of a switch and wherein the predetermined operative condition comprises release of the switch.

16. A method according to claim 12 wherein the step of sensing a predetermined operative condition comprises sensing an acceleration experienced by the scan module and determining that the acceleration sensed exceeds a threshold magnitude.

17. A scanning module for reading objects, said module comprising:

an oscillatable scanning component for directing a light beam toward the object being read;

a flexure having a fixed end operatively connected to the base, and a movable end operatively connected to the scanning component;

drive means for flexing the spring and oscillating the scanning component about an axis during reading; and means for resisting overflexing the flexure when the module is subjected to shock forces, including means for securing the oscillatable scanning component to a fixed element.

18. A scanning module according to claim 17, wherein the scanning component includes a mirror assembly.

19. A scanning module according to claim 17, wherein the scanning component includes a light source.

20. A scanning module according to claim 17, wherein the flexure comprises a spring, and wherein the spring lies in a plane generally perpendicular to the mirror in an unflexed condition of the spring.

21. A method of operation of a handheld data reader, comprising the steps of generating an optical beam;

pivoting a mechanical scan element to scan the optical beam over a scan angle;

activating the pivoting of the scan element in response to actuation of a trigger; and in response to release of the trigger, deactivating the pivoting of the scan element and locking the scan element in place to a fixed element for preventing damage to scan element components when the data reader is subjected to shock forces.

22. A scanning system for data reading comprising:

a light source generating a reading beam;

a scanning component for directing a light beam toward an object being read;

drive means for driving the scanning about an axis during reading;

a locking element for securing the scanning component, wherein scanning system is adapted for first and second modes of operation, said scanning component when in said first mode of operation being in a first position enabled to be driven by the drive means, said scanning component when in said second mode of operation being in a second position enabled to be secured by the locking element.

23. A scanning system according to claim 22 comprising a portable handheld scanning unit.

24. A scanning system for data reading comprising:

a light source generating a reading beam;

a scanning component for directing a light beam toward an object being read;

drive means for driving the scanning about an axis during reading;

a locking element for securing the scanning component, wherein the scanning system is adapted for first and second modes of operation, said scanning component when in said first mode of operation being in a first position enabled to be driven by the drive means, said scanning component when in said second mode of operation being in a second position enabled to be secured by the locking element;

an acceleration sensor for sensing acceleration experienced by the scanning component, wherein the scanning component is secured by the locking element upon the acceleration sensor sensing that the acceleration sensed exceeds a threshold magnitude.

* * * * *